Jan. 29, 1963 L. B. McCOY 3,075,652
FILLED CAN DEPALLETIZER
Filed July 3, 1961 6 Sheets-Sheet 1
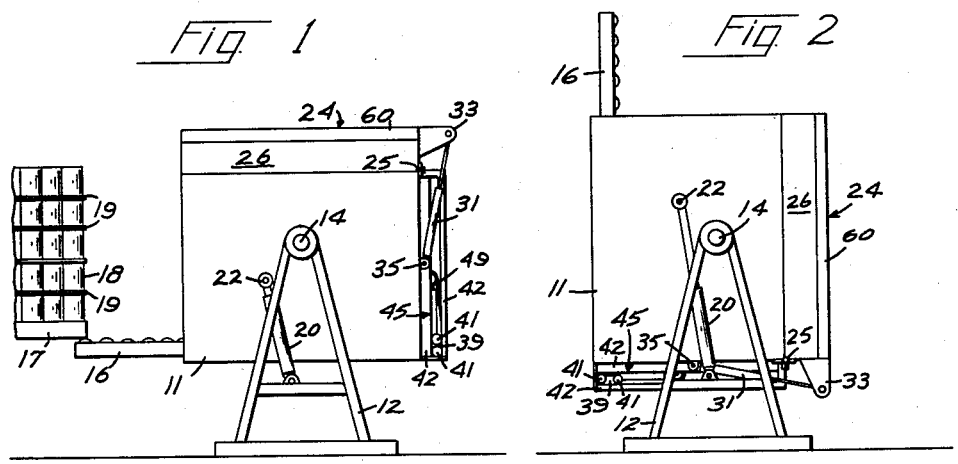
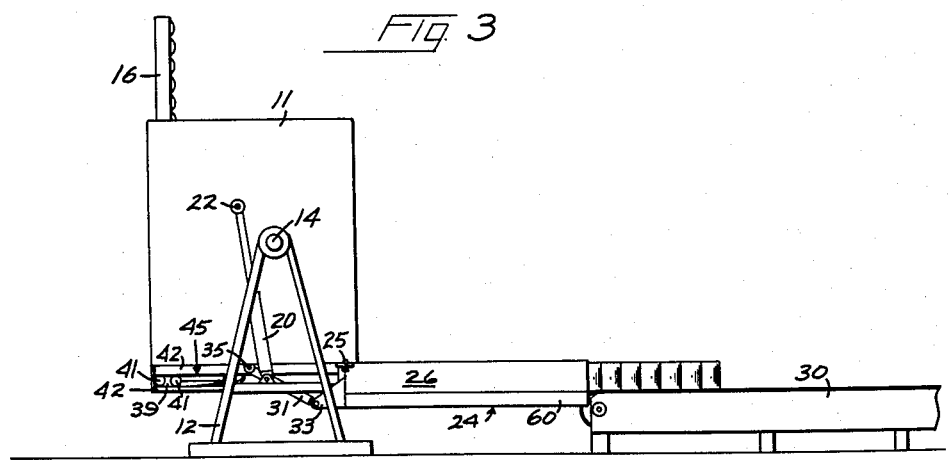
INVENTOR.
Lawrence B. McCoy
BY
Attys.

Jan. 29, 1963     L. B. McCOY     3,075,652
FILLED CAN DEPALLETIZER
Filed July 3, 1961     6 Sheets-Sheet 2
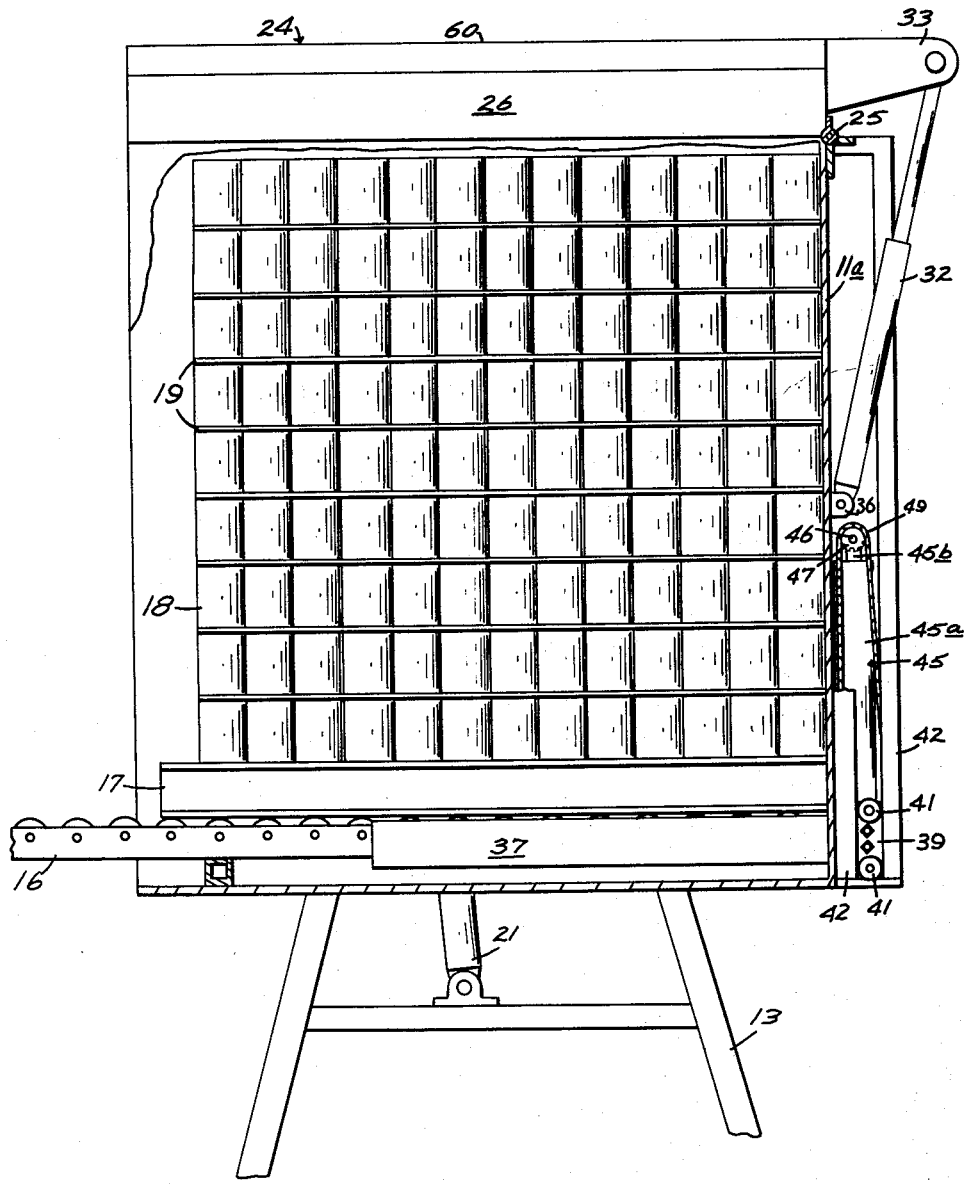
INVENTOR.
Lawrence B. McCoy
BY Attys.

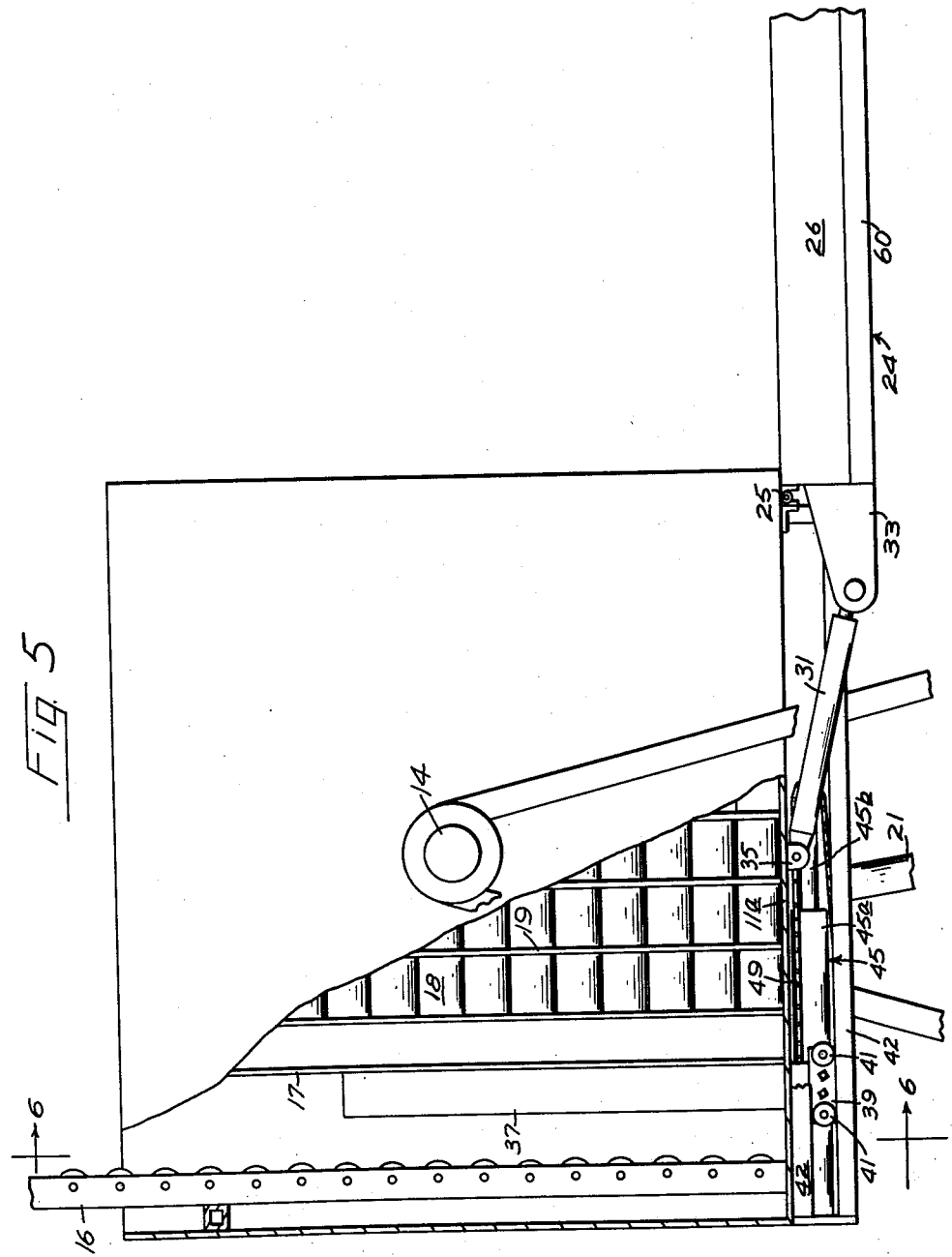

Jan. 29, 1963 L. B. McCOY 3,075,652
FILLED CAN DEPALLETIZER
Filed July 3, 1961 6 Sheets-Sheet 4

INVENTOR.
Lawrence B. McCoy
BY
Attys.

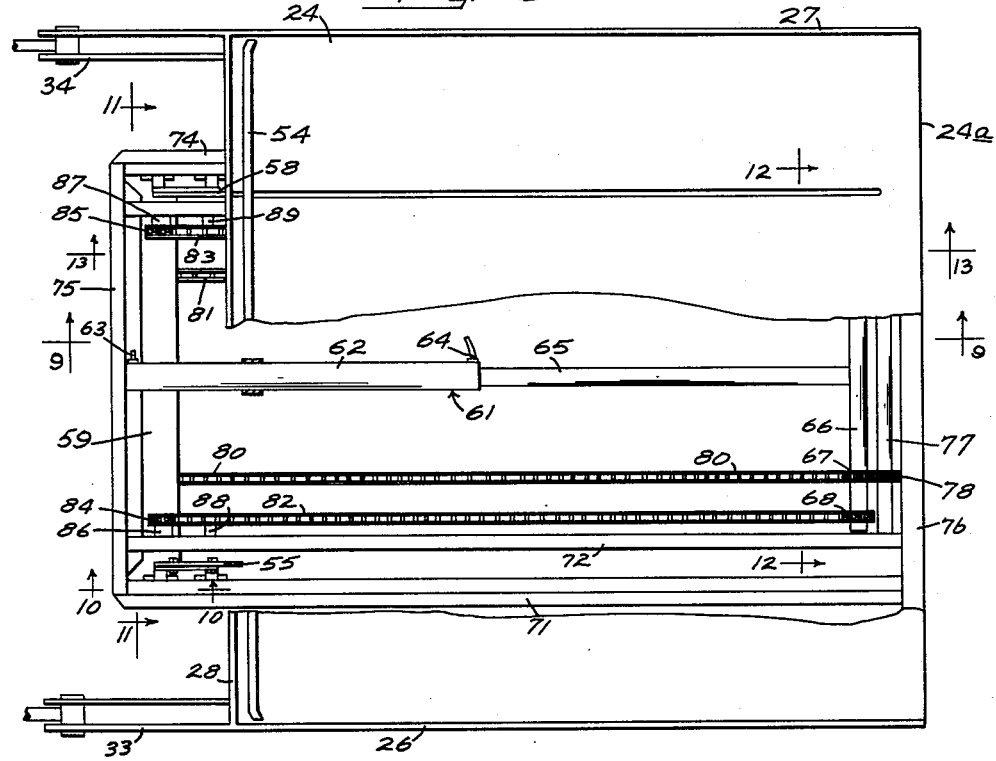
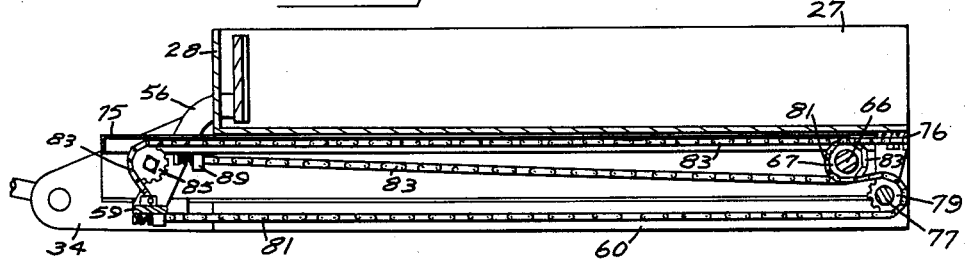
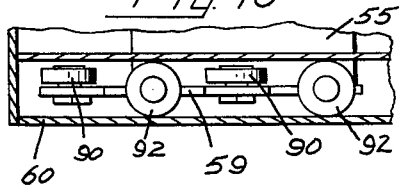

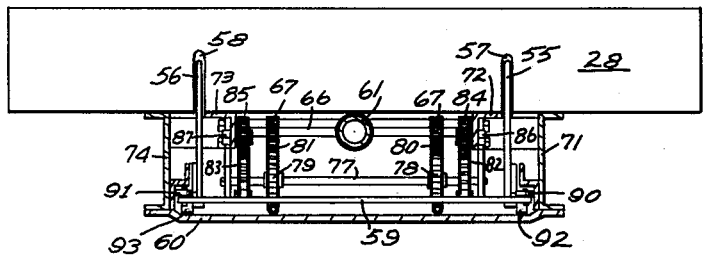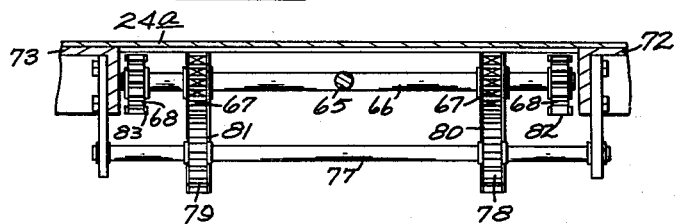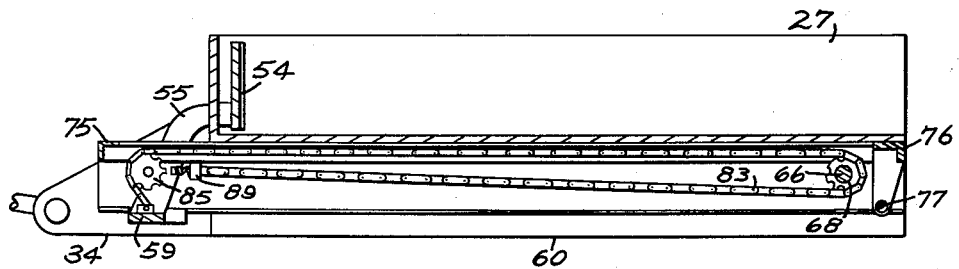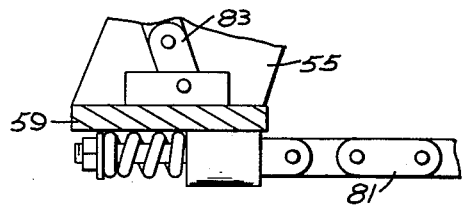

United States Patent Office 3,075,652
Patented Jan. 29, 1963

3,075,652
FILLED CAN DEPALLETIZER
Lawrence B. McCoy, Walla Walla, Wash., assignor to Key Equipment Company, Milton-Freewater, Oreg., a corporation of Oregon
Filed July 3, 1961, Ser. No. 121,509
7 Claims. (Cl. 214—8.5)

The present invention relates to a filled can de-palletizer. These machines are adapted to take a pallet load of filled cans from a lift truck and deliver them to a conveyor by which they may be carried to various processing equipment such as marking, labeling, packaging, etc. equipment. It is common practice now to stack the filled cans upright in layers upon a pallet with separating sheets between the layers of upright cans; the sheets being relatively stiff. These pallet loads of cans are stored on the pallets until the plant is ready to mark and package them.

It is the purpose of the present invention to provide a machine that combines means upon which the lift truck can deposit a pallet and its load of layers of cans within a receiver or a container, means to turn the receiver-container to place the pallet on edge and means to then remove the several layers of cans, layer by layer to horizontal position where the cans are again upright and to discharge the layers so removed on to a receiving device such as a feeding conveyor that supplies the machines that subsequently act upon the cans.

More particularly it is the purpose of this invention to provide a machine that takes cans by the pallet load and tips the pallet and cans on edge, then further tips the layers of cans successively over to place the cans upright upon a support, in inverted position with respect to the position they occupied on the pallet, and finally moves the layer of cans horizontally off the support.

The nature and advantages of the invention and other more detailed objects thereof are expalined and shown in the following description and the accompanying drawings of a preferred embodiment of the invention. The drawings and description are illustrative only and various modifications may be made within the scope of the claims defining the invention.

In the drawings:

FIGURE 1 is a side view of the machine showing it as receiving a pallet load of cans;

FIGURE 2 is a side view of the machine showing it tipped 90 degrees from FIGURE 1 to bring a loaded pallet therein to the second position where the pallet is upright and the layers of cans are at the right hand side of the pallet;

FIGURE 3 is a side view showing the machine in the position where it delivers the originally uppermost layer of cans, horizontally to a receiving device;

FIGURE 4 is a view partly in section and partly in side elevation showing the pallet and cans in the position they occupy when the tipping operation is about to begin;

FIGURE 5 is an enlarged side view similar to FIGURE 3 but with parts broken away to illustrate the interior mechanism by which the layers of cans are moved to the position where each layer is separated from those remaining;

FIGURE 8 is a plan view with parts broken away looking down on the can layer receiving pan when it is lowered to the position shown in FIGURE 5;

FIGURE 9 is a sectional view taken on the line 9—9 of FIGURE 8;

FIGURE 10 is a fragmentary sectional view taken on the line 10—10 of FIGURE 8;

FIGURE 11 is a sectional view on the line 11—11 of FIGURE 8;

FIGURE 12 is a sectional view on the line 12—12 of FIGURE 8;

FIGURE 13 is a sectional view on the line 13—13 of FIGURE 8; and

FIGURE 14 is an enlarged fragmentary view illustrating the mounting used for the sprocket chains.

Figure 6:
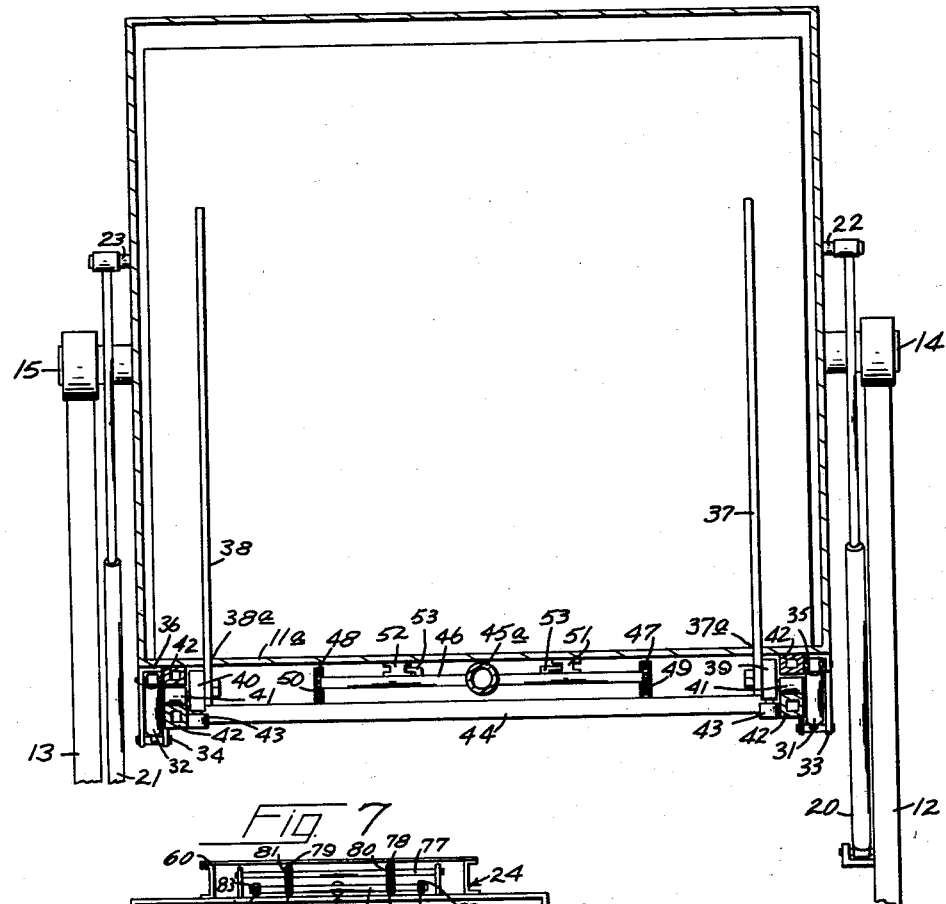
FIGURE 6 is a sectional view taken on the line 6—6 of FIGURE 5.
Figure 7:
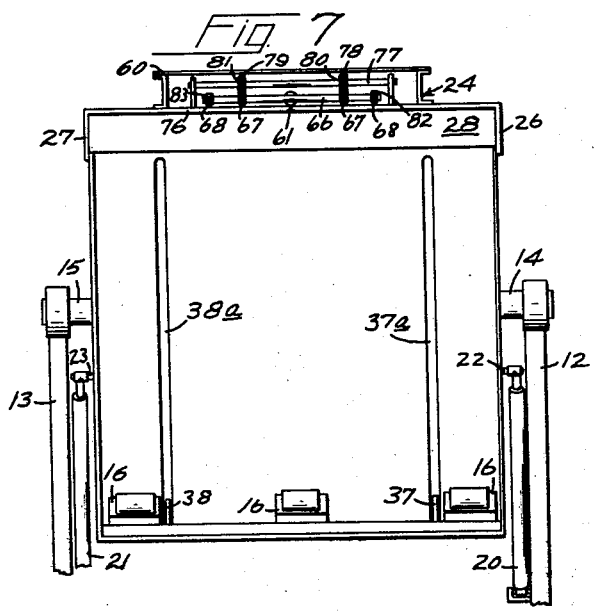
FIGURE 7 is an enlarged end view looking at FIGURE 1 from the left.

Referring to FIGURES 1, 2, 3 and 6, in these figures the machine is shown as comprising a box-like pallet receiver and container 11 which is mounted on a pair of A frame standards 12 and 13 by stub shafts 14 and 15 so that the receiver 11 can pivot about the axis of the stub shafts. The receiver 11 has roller frames 16 therein which project out as shown in FIGURE 1, to receive a pallet 17 having layers 18 of cans thereon. The layers 18 are separated by sheets 19 of any suitable material. Paper stock of sufficient stiffness is commonly used for the sheets 19. The receiver 11 is held in the position shown in FIGURE 1 by two hydraulic jacks 20 and 21 pivoted on the frames 12 and 13 and pivoted to the receiver by stub shafts 22 and 23.

The receiver 11 has a lid 24 which is hinged to the receiver by hinges 25 and which has side walls 26 and 27 and a cross wall 28 positioned at the edge of the lid most remote from the load receiving end of the receiver 11. The function of the lid 24 is to act as a pan to receive a layer of cans and swing that layer away from the remaining layers and down to a near horizontal position where the layer of cans can be moved off the lid 24 onto a receiving device such as a conveyor 30 illustrated in FIGURE 3. The lid 24 is held closed by two hydraulic jacks 31 and 32 that are connected between projecting arms 33 and 34 on the lid and lugs 35 and 36 on the receiver wall 11a.

The pallet 17 when it is received within the receiver 11 can be rolled on the roller frames 16 until the advancing end thereof abuts the wall 11a. This is the position the loaded pallet occupies when the tipping operation begins. (See FIGURE 4.) Before the jacks 20 and 21 are operated to move the receiver 11 to the position shown in FIGURE 2 it is desirable to push the several layers of cans toward the lid 24 so that the layer 18 farthest from the pallet 17 will be seated in the lid. In this operation the pallet 17 and the layers of cans slide on the surface of the wall 11a. To push the pallet 17 and the layers 18, pusher bars 37 and 38 are used. These pusher bars are located beside the roller frames 16 and extend through slots 37a and 38a in the wall 11a. Blocks 39 and 40 are affixed to the lower ends of the pusher bars 37 and 38. Each of the blocks 39 and 40 has a pair of rollers 41 on one side thereof that run between frame members 42 that are affixed to the receiver 11. Each of the blocks 39 and 40 also has a bottom roller 43 thereon which engages with the side of the frame member 42.

The blocks 39 and 40 are connected to each other by a cross bar 44. This cross bar 44 extends beneath a hydraulic jack 45 that has its cylinder 45a affixed to the receiver 11 and its piston rod 45b provided with a cross head 46. The cross head 46 has sprocket wheels 47 and 48 at its ends. Sprocket chains 49 and 50 are trained over the sprocket wheels 47 and 48. One end of each chain is fastened to the cross bar 44. The other end of each chain is affixed to the receiver wall 11a. This construction provides a means of pushing the pusher bars 37 and 38 in the direction to advance layers of cans into the lid 24. No return means need be provided for returning the bars 37 and 38 to the starting position. The weight of the bars 37 and 38 plus that of the blocks 39 and 40 and the cross bar 44 amount to enough to return the bars 37 and 38 to the position shown in FIGURE 4 when the hydraulic pressure is released in the cylinder 45a and the machine is returned to the position where the roller frames 16 are horizontal. Slide guides 51 and 52 may be provided for the crosshead 46 which has members 53 thereon to engage the guides.

The lid 24 has means therein to push a layer 18 of cans out upon a receiver 30. This means comprises a pusher blade 54 which is movable substantially full length of the pan like lid 24 to expel the cans therefrom. The blade 54 is carried by two curved arms 55 and 56 (see FIGURES 8 and 9), that are affixed to the blade 54 and project through slots 57 and 58 provided in the lid 24 and its cross wall 28. The arms 55 and 56 are carried by a bar 59 that is moved to and fro lengthwise of the lid 24. Any suitable means may be used to give the blade 54 the necessary reciprocating movement. The blade 54 should be positively moved in both directions however because it has to push the layer of cans off of the pan like lid 24 and return to starting position while the lid 24 is down in the position shown in FIGURE 3 of the drawings. The pusher blade 54 must be in position to receive the next layer of cans when the pusher bars 37 and 38 advance the load of pallet and cans in the receiver 11. While one can return the blade 54 to receiving position during the time that the lid 24 is being raised, it is better not to trust to gravity to do this.

The mechanism illustrated for reciprocating the bar 59 and the blade 54 is mounted on the back of the lid 24 and housed by a cover 60. This mechanism comprises a double acting hydraulic jack 61, the cylinder 62 of which has connections 63 and 64 by which fluid under pressure may be applied at either end thereof to move the piston rod 65 of the jack in either direction. The rod 65 has a cross head 66 thereon. At each end of the cross head two sprocket wheels 67 and 68 are journalled thereon. A frame 70 is secured to the lid 24 on the side thereof opposite to the side that receives the layer of cans. This frame 70 has four lengthwise ribs 71, 72, 73 and 74 and end pieces 75 and 76 at the ends. The inner ribs 72 and 73 mount a cross rod 77 which has two sprocket wheels 78 and 79 journalled thereon adjacent to its ends.

To pull the blade 54 from the loading position shown in full lines in FIGURE 8 to the other end of the lid 24 two chains 80 and 81 have one end of each affixed to the bar 59. These chains then pass over the sprocket wheels 78 and 79 then around the sprocket wheels 67 and then back to the end piece 76 where they are affixed. If the cross head 66 is moved toward the cylinder 62 it increases the lengths of the chain loops around the sprocket wheels 67 and pulls the bar 59 up to the cross rod 77. This causes the arms 55 and 56 to move the blade 54 to the edge 24a of the lid 24 thereby to push any cans on the lid 24 off this edge and on to the receiver 30.

To return the blade 54 to its original position two additional chains 82 and 83 are provided. Also two sprocket wheels 84 and 85 are journalled on stub shafts 86 and 87 that are provided on the ribs 72 and 73. The chain 82 has one end attached to the cross bar 59. From the cross bar 59 the chain 82 passes over the sprocket wheel 84 then up to the cross head 66 and around the corresponding sprocket wheel 68 at that end of the cross head and then back to a mounting block 88 on the adjacent rib 72. The chain 83 has one end attached to the cross bar 59. From the cross bar 59 the chain 83 passes over the sprocket wheel 85 then up to the cross head 66 and around the corresponding sprocket wheel 68 at that end of the cross head and then back to a mounting block 89 on the adjacent rib 73.

The cross bar 59 is provided at each end with a pair of guide rollers 90 and 91 adapted to ride on the inner faces of the adjacent sides of the frame 70. The bar 59 also has at each end another pair of guide rollers 92 and 93 that ride on the top surfaces of the adjacent ribs 71 and 74. These guide rollers support the bar 59 and guide it in the proper plane to move the pusher blade 54 freely within the lid 24.

The machine in operation first receives a pallet 17 with its load of cans on the roller frames 16. The pallet is pushed into the receiver 11 until the end of the load abuts the wall 11a. The side walls 11b and 11c of the receiver are spaced apart the distance necessary to admit the pallet with slight clearance. Next the jack 45 is actuated to lift the pallet load into position so the top layer of cans is seated in the lid 24. Then the jacks 20 and 21 are operated to tip the receiver 11 to the position shown in FIGURE 2. This is the unloading position. The cans cannot be displaced during the tipping because they are confined between the pallet 17 and the lid 24 and between the side walls 11b and 11c of the receiver 11. In this tipped position the wall 11a becomes the bottom of the receiver 11.

Next the lid 24 is tilted away from the receiver 11 by operation of the jacks 31 and 32. Since the first layer 18 of cans is completely within the lid 24, this layer, with the sheet 19 between it and the next layer of cans, will swing out and down to unloading position leaving the remaining layers undisturbed. The lid 24 is stopped at unloading position which may or may not be fully horizontal. Then jack 61 is next operated to cause the pusher blade 54 to remove the cans from the lid 24. That is, the cross head 66 is pulled toward the cylinder 62 causing the chains 80 and 81 to move the bar 59 and the blade 54 to the right from the position shown in FIGURE 8. After the cans are all removed from the lid 24, the jack 61 is reversed and the cross head 66 is returned to the position shown in FIGURE 8. This movement causes the chains 82 and 83 to pull the bar 59 and the blade 54 back to the position shown in FIGURE 8. The lid 24 is then ready to receive another load as soon as the jacks 31 and 32 can swing the lid 24 into position to close against the receiver 11.

When the lid 24 is against the receiver 11 then the jack 45 is actuated again to move the load toward the lid 24 and put the next layer of cans into the lid. Then the lid 24 is again lowered and emptied and these operations are repeated until the entire load is removed. The operator picks off the sheets 18 as they are lowered on the lid 24. Also when the pallet 17 is fed into the lid 24 and lowered it is lifted off of the lid 24 and set aside by the operator.

This machine provides a simple way of taking cans from loaded pallets and delivering them in layers of one can depth. A lift truck can place the loaded pallets directly on the machine and take away the empty pallets as they accumulate. The capacity of the machine with one operator is ample to supply high speed labeling and packaging lines.

Having described my invention, I claim:

1. A machine for transferring such articles as cans from a stack on a rectangular pallet to a receiving device a layer at a time comprising a receiving conveyor having upright side walls spaced apart a distance slightly greater than one horizontal dimension of the pallet to receive a loaded pallet therebetween, said container having a pallet support between said walls upon which a loaded pallet may be deposited and having a wall connecting said side walls and perpendicular to said pallet support, a lid opposite to the pallet support extending from one side wall to the other and having a back flange pivotally joined to the container, said lid having side flanges substantially aligned with the side walls, means supporting and pivotally mounting said container for angular movement about an axis perpendicular to said side walls, means to move said container about said axis enough to bring the pallet support from horizontal to upright position, pushers in the container movable from the pallet support toward the lid for advancing layers of cans into said lid, means carried by the container and connected to the lid operable to swing the lid away from the container, and means mounted in the lid operable to push the layer of cans thereon off the lid.

2. A machine for transferring such articles as cans from a stack on a pallet, a layer at a time, comprising a boxlike receiver container, pivot means on two opposite side walls of said container supporting it for pivotal movement, a connecting wall joining one edge of each side wall with the other, a lid hinged to the connecting wall to swing toward and away from the adjacent edges of the side walls, pusher means between the side walls movable toward and away from said lid, means to swing said lid, means to move said pushers, roller conveyors between the other edges of the side walls, and power means connected to said container for turning it between a load receiving position where the roller conveyors are horizontal, and a load discharge position where the connecting wall is horizontal.

3. A machine for unloading cans a layer at a time from a pallet upon which several layers of cans are stacked comprising a rectangular container having one side of its six sides open, a support for said container including pivots about which the container may be turned to cause said open side to face horizontally or vertically, the side of said container which is uppermost when the open side faces horizontally comprising a tray-like lid hingedly attached to the container at its end most remote from the open side of the container, means connected to said container to position the open side uppermost, means in the container operable to move a load of cans therein toward the lid to bring the uppermost layer of cans into the lid, and means to swing the lid outwardly from the container and downwardly with a layer of cans therein to a position where the layer of cans may be moved laterally off the lid.

4. A machine for unloading cans a layer at a time from a pallet upon which several layers of cans are stacked, comprising a container having support means along one side thereof upon which a pallet loaded with cans may be deposited, means to tip the container with a loaded pallet therein, to bring the pallet on edge, the container having walls positioned thereon to retain the cans in their respective layers when so tipped, one of said walls being opposite the side on which the pallet is deposited and being hinged to the container to swing away from the container outward and downward whereby to move a layer of cans away from the pallet to a horizontal position in which the cans are inverted from the position they occupied on the pallet, and means in the container operable to push the pallet and layers thereon against said hinged wall.

5. The invention defined in claim 4 wherein the hinged wall has means thereon to push the cans thereon to one edge of the wall while it is swung away from the container.

6. The invention defined in claim 4 wherein the support means comprises roller carrying frames projecting from the container and spaced from each other to receive a pallet thereon from a lift truck.

7. The invention defined in claim 4 wherein the last named means comprises a pair of bars extending parallel to said support means in said container, and means connected to said bars and the container operable to move the bars across the container toward the hinged wall.

No references cited.